D. F. RUNION.
TRAP.
APPLICATION FILED MAR. 19, 1910.
983,934.
Patented Feb. 14, 1911.
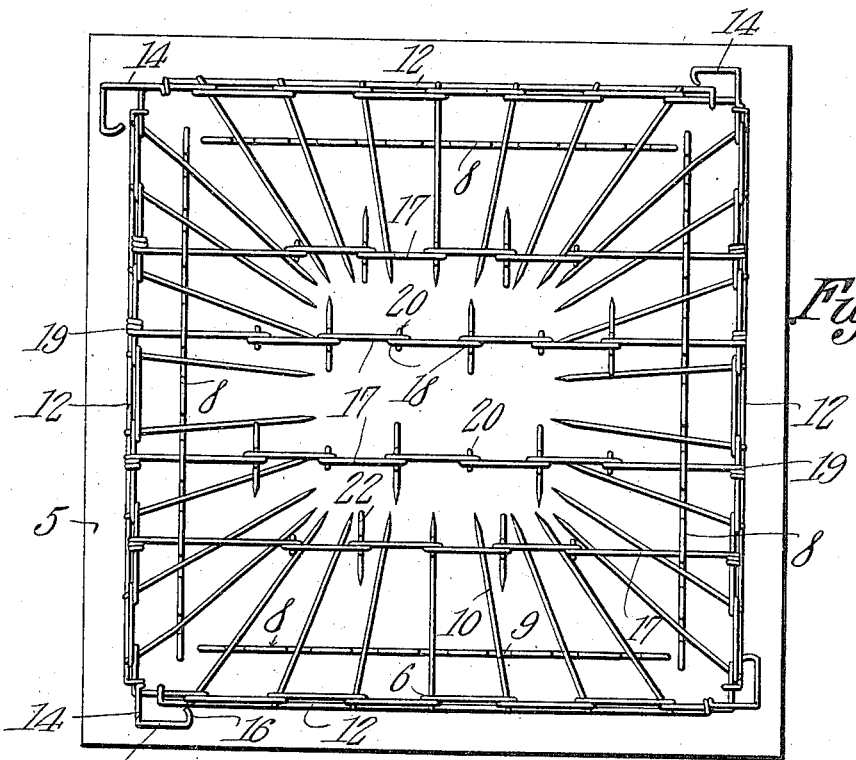
Fig. 1.
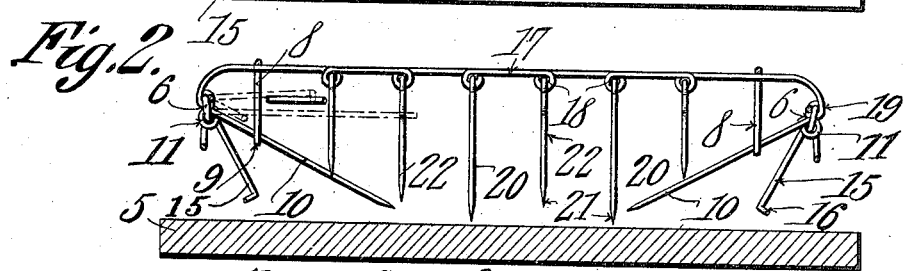
Fig. 2.
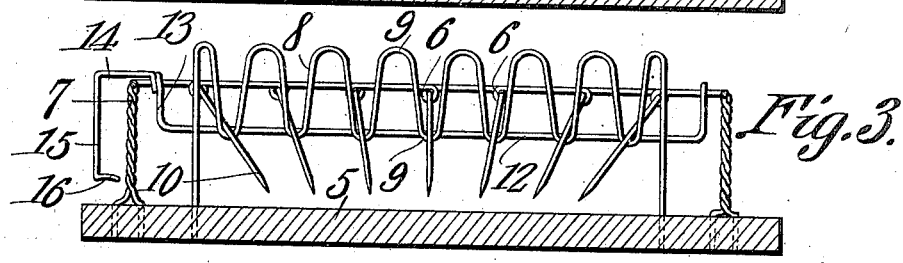
Fig. 3.
Fig. 4.
Witnesses
Inventor
David F. Runion.
By C. A. Snow & Co.
Attorney.

UNITED STATES PATENT OFFICE.

DAVID F. RUNION, OF BROADWAY, VIRGINIA.

TRAP.

983,934.

Specification of Letters Patent. Patented Feb. 14, 1911.

Application filed March 19, 1910. Serial No. 550,395.

*To all whom it may concern:*

Be it known that I, DAVID F. RUNION, a citizen of the United States, residing at Broadway, in the county of Rockingham and State of Virginia, have invented a new and useful Trap, of which the following is a specification.

It is the object of the present invention to provide an improved trap and the improvements are directed to a trap which may be put to a number of uses; that is to say, it may be used as a rat or mouse trap or may be designed for use as a fish trap, and may further be designed and used as a game trap.

The improvements of the present invention are directed more especially to a trap of that class which may be readily entered from all sides, but from which exit cannot be had. Said traps usually embody wire members which are pivoted and rest at their lower ends upon the base of the trap and which are inclined downwardly and inwardly so that an animal may readily enter the trap by crawling beneath the members, but cannot leave the trap owing to the fact that the said members are inclined, as stated. It has been found, however, that unless an animal is extremely hungry, it will not enter such a trap, and the present invention therefore aims to provide means for overcoming any aversions which the animals may have for the trap, and such means is embodied in devices provided for supporting the gravity members of the trap in raised position whereby the animals may freely enter and leave the trap and may consume such food as may be placed therein, and thus become accustomed to the trap and its parts.

In the accompanying drawings,—Figure 1 is a plan view of a trap constructed in accordance with the present invention. Fig. 2 is a vertical sectional view therethrough, parts being omitted for the sake of clearness. Fig. 3 is also a vertical sectional view illustrating the means provided for supporting the gravity members of the trap in raised position, and Fig. 4 is a detail view of one of the gravity members located within the trap.

In the drawings, the trap is illustrated as embodying a base, which is indicated by the numeral 5. While the trap is illustrated as being rectangular in form, it will be readily understood, from the description which is to follow, that it may assume almost any other desired shape without departing from the spirit of the invention. Each side member of the trap is embodied in a single strand of wire looped at a number of points between its ends to afford eyes 6, the said strand adjacent each end, being bent downwardly at right angles and twisted with the corresponding or adjacent ends of the strands constituting the adjacent side members of the trap, as at 7.

Located directly inwardly of each side member of the trap is a wicket, indicated in general by the reference numeral 8, and serving not only as a baffle but also as a guide and spacing means for the gravity members of the trap, as will be presently explained. Each of these wickets consists of a single strand of wire secured at its ends in the base 5 of the trap and bent between its ends to afford a number of convolutions 9 which are alternately presented up and down. It is preferable that the convolutions of the said wickets be spaced above the base 5 and that they project above the side members of the trap, as clearly illustrated in Fig. 3 of the drawings.

The gravity members heretofore mentioned are embodied each in the strand of wire 10 bent at one end to afford an eye 11 pivotally engaged in the eyes 6 of the side members of the trap, and these said gravity members 10 normally incline downwardly inwardly and rest with their free ends immediately above the base of the trap, as illustrated in Fig. 2 of the drawings. It will be observed that each of the said members projects through one of the downwardly presented convolutions 9 of the adjacent wicket and that while these said members 10 may be readily lifted by an animal crawling under them, they will be guided by the sides of the respective convolutions and will be prevented from becoming laterally displaced. It will further be understood that the space between the convolutions of the wicket and the upper surface of the base of the trap is sufficient to allow an animal to pass therebeneath. Furthermore, it will be observed that the downwardly presented convolutions are spaced apart a distance less than the space between the eyes 6 of the adjacent and related side member of the trap, so that the gravity members at each side of the trap will not only project inwardly from the side members to which they are pivoted, but will project in the general direction of the center of the base of the trap. This results in the inner ends of the said gravity members being spaced apart a distance less than their outer or pivot ends so that with small animals, a less space will be afforded through which he might attempt to escape.

As has heretofore been stated, means is provided for supporting the gravity members of the trap when it is desired to allow the animals, to be eventually trapped, to freely enter and leave the trap and consume whatever food may be placed therein for the purpose of enticing them to the vicinity and making them familiar with the trap and the several parts thereof, and this means is embodied in members which are mounted to rock one upon each of the side members of the trap so that when swung up, the gravity members which are pivoted to the said side member, will be simultaneously raised, permitting free entrance and exit, as above stated. The means mentioned is embodied in a single strand of wire which at one end and adjacent its other end is bent at right angles to its body portion 12, as at 13, and connected pivotally with one of the side members of the trap. Beyond that one of its points of connection with the said side member of the trap which is located inwardly of one end of the strand, the said strand is bent to extend parallel to its body portion 12, as at 14, and thence downwardly at right angles, as at 15, and finally inwardly at right angles, as at 16. It will be readily understood from the above that the portion 15 of each of the devices for supporting the gravity members, may be grasped and the said member swung up to dotted line position, as shown in Fig. 2 of the drawings, it being understood that the gravity members 10 upon each side member of the trap are simultaneously elevated when the related member 12 is swung up and it will further be understood that after so swinging the member, the same may be slid over upon the related side member and its terminal portion 16 may be engaged with the adjacent side member of the frame whereby the parts will be held in elevated position.

A strand 17, of wire, is bent between its ends to afford a number of eyes 18 and at its extremities is bent in engagement, as at 19, with opposite ones of the said members of the trap, it being observed that there are several of these strands and that they run parallel with respect to each other. From each eye there is pivotally suspended a retention member and certain of these members, indicated by the numeral 20, are merely in the nature of single strands of wire pivotally connected at their upper ends to alternate ones of the said eyes 18, and pointed at their lower ends, as at 21, and the other ones of the said members are also in the nature of single strands of wire, but instead of being straight, they are bent angularly, as at 22. These several members in adjacent ones of the supporting wires 17 are alternated, or in other words, are arranged in staggered relation and the members 22 have their pointed ends presented toward adjacent sides of the trap. It will be readily understood that the retention members and the wires from which they are pivotally suspended, serve to prevent an animal in the center of the trap, couching his body for a spring over the sides of the trap. Furthermore, pieces of meat and other bait may be supported upon the said retention members if desired.

From the foregoing it will be readily understood that an animal may readily enter the trap, but that when once within the space defined by the free ends of the members 10, escape from the trap is an impossibility.

What is claimed is:

In a trap of the class described, side members, gravity elements pivoted to the side members and held relatively spaced, a plurality of supporting members extending across the trap from one to the other of the side members, and retention elements pivoted to swing freely from the supporting members, certain of said retention elements being straight and others being bent angularly.

In testimony that I claim the foregoing as my own, I have hereto affixed my signature in the presence of two witnesses.

DAVID F. RUNION.

Witnesses:
H. H. ALDHIZER,
D. F. GEIL.